United States Patent
Suzuki et al.

(10) Patent No.: US 6,505,946 B2
(45) Date of Patent: *Jan. 14, 2003

(54) SPREAD ILLUMINATION APPARATUS

(75) Inventors: Shingo Suzuki, Asaba-cho (JP); Masafumi Okada, Asaba-cho (JP); Koichi Toyoda, Asaba-cho (JP)

(73) Assignee: Minebea Co., Ltd., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,280

(22) Filed: Oct. 27, 1999

(65) Prior Publication Data
US 2002/0036900 A1 Mar. 28, 2002

(30) Foreign Application Priority Data
Jan. 29, 1999 (JP) .............. 11-022079

(51) Int. Cl.[7] ................. F21V 8/00
(52) U.S. Cl. ............. 362/31; 362/558; 362/27
(58) Field of Search ............ 362/31, 26, 355, 362/362, 307, 308, 558, 511, 27; 349/64; 385/901

(56) References Cited

U.S. PATENT DOCUMENTS

| | | | | |
|---|---|---|---|---|
| 4,714,983 A | * | 12/1987 | Lang ................... | 362/27 |
| 4,860,171 A | * | 8/1989 | Kojima ................ | 362/31 |
| 5,099,343 A | * | 3/1992 | Margerum et al. .... | 359/48 |
| 5,165,772 A | * | 11/1992 | Wu ..................... | 362/511 |
| 5,233,679 A | * | 8/1993 | Oyama ................ | 362/558 |
| 5,598,280 A | * | 1/1997 | Nishio et al. ......... | 349/57 |
| 5,648,858 A | * | 7/1997 | Shibata et al. ....... | 349/57 |
| 5,667,289 A | * | 9/1997 | Akahane et al. ..... | 362/31 |
| 5,931,555 A | * | 8/1999 | Akahane et al. ..... | 362/31 |
| 6,283,602 B1 | * | 9/2001 | Kawaguchi et al. .. | 362/31 |
| 6,293,683 B1 | * | 9/2001 | Okada ................. | 362/31 |
| 6,334,691 B1 | * | 1/2002 | Suzuki et al. ........ | 362/31 |
| 6,371,623 B1 | * | 4/2002 | Toyoda ............... | 362/31 |

FOREIGN PATENT DOCUMENTS

JP  10-182076  4/1998

* cited by examiner

Primary Examiner—Sandra O'Shea
Assistant Examiner—Anabel Ton
(74) Attorney, Agent, or Firm—Oliff & Berridge, PLC

(57) ABSTRACT

According to the strength of the leak light from the spot-like light source 12, the light diffusion film 20, the light diffusion co-efficient is changed is disposed between the flat transparent substrate 3 and the light source portion 10, 12. Thereby, by diffusing the strength of the leak light, the incident light to the one side end face 4 of the resin substrate 3 is made approximately even, and the direct entering of the leak light into the flat transparent substrate is suspended and thereby the generation of the bright line is suspended to realize an even and spread illumination.

18 Claims, 6 Drawing Sheets

SPREAD ILLUMINATION APPARATUS

BACKGROUND OF THE INVENTION

1. Field of the Invention

The present invention relates to a spread illumination apparatus for use of illuminating a signboard and various kind of reflection type of signboards, in particular, a liquid crystal display apparatus.

2. Related Arts

A liquid crystal display, since it is thin in dimension, light-weighted and low in electric consumption, has been increased in its demand for use of a display apparatus mainly for computer. The liquid crystal, which is a constitutional member of the liquid crystal display apparatus, does not light by itself, and different from a lighting element such as a cathode ray tube needs an illumination means for observing the picture of the liquid crystal. Due to the recent tendency of demanding a thin-sized illumination means, quite often a thin-plate like spread illumination apparatus, that is, a side light system (light conductive system) of illumination apparatus has been used by putting it behind the liquid crystal display.

Hereinafter, based on FIG. 5 one outlined structure of the side light system of spread illumination apparatus 41 is explained.

A flat transparent substrate 43 made of a member having a high transparency to the light is configured thin approximately rectangular in section, along one side end face 44 a linear light source lamp 42 is disposed. For reference, in order to make it light-weighted the flat transparent substrate 43 may happen to be formed as a wedge-like.

In order to make the most lights of the light source lamp 42 inside the flat transparent substrate 43, around the lamp 42 is covered with a lamp reflector 45. Further, In order to prevent the light from leaking, side faces (in FIG. 5, merely a side face 46 opposite to the side face 44 is shown) other than the one side face 44 of the flat transparent substrate 43 are added with a reflection member 47 consisting of a reflection tape etc.

The rear side 48 (lower in FIG. 5) of the flat transparent substrate 43 is formed with a light diffusion pattern 49 as a spread illumination apparatus for illuminating even a picture regardless the distance from the light source lamp 42, further lower, a reflection film 50 to reflect the light toward a surface 51 (upper in FIG. 5) is disposed.

And, on the surface 51 of the flat transparent substrate 43 a light diffusion film 52 is disposed. The light diffusion film 52 is disposed for avoiding a dot image which is generated by emitting the light from the surface of the display, which are progressing through the flat transparent substrate 43 and most of which reflected by the light diffusion pattern 49.

The light diffusion pattern 49, the pattern of which is shown in FIG. 6, is formed in such a manner as the diameter of the dot becomes larger according to approaching to the side end face 46 from the opposite side end face 44 where the light source lamp 42 is disposed, by applying a medium containing the light diffusing material directly to the flat transparent substrate 43.

Thus, the light diffusion pattern 49, by forming it while varying the rate under which a medium containing the light diffusion and reflection material occupies per unit area according to its location (hereinafter, the rate where a given material occupies per unit area is called as "area density"), and by changing the light volume emitted from the surface 51 after being reflected by the light diffusion pattern 49, is adapted to emit the light for the face as a whole (the surface 51) with an even brightness. Here, the light diffusion pattern 49 is shown in FIG. 6 as being hatched for easy looking although it is not in section.

The above light diffusion pattern 49 is formed by being applied with a medium containing a light diffusion and reflection material and it may be what has a function to increase the light volume to be reflected, and for example as disclosed in Japanese patent laid-open No. Hei 9-33923 there is what makes the light diffuse and reflect due to a concave-convex surface to be formed directly on the rear surface 48 of the flat transparent substrate 43.

Next, a structure of an illumination apparatus to be used as an auxiliary illumination apparatus in particular for a reflection type of liquid crystal display is explained by outlining it.

Here, mentioning a reflection type of liquid crystal display apparatus, it has a constitution where as an illumination light for illuminating a picture a surrounding light can be used, therefore it does not include inside any illumination apparatus. Accordingly, although, in case the surrounding around the reflection type of liquid crystal display apparatus is bright, an observation of the picture may be possible, if it is comparatively dark, there can be a problem where the observation of the picture is difficult due to the insufficient brightness of the surrounding, therefore in order to observe the picture even if the brightness is not sufficient, it is needed to prepare an auxiliary illuminating means.

As this auxiliary illuminating means, as shown in FIG. 7, there is a spread illumination apparatus 1'. In that constitution, a bar-like (linear) light source lamp 2 is disposed nearby one side end face 4 of a plain flat transparent substrate 3 made of a material high in light permeability and formed rectangular in section.

The flat transparent substrate 3 may be formed wedge-like in configuration for making it light-weighted.

Here, in FIG. 7, one surface abutting to a reflection type of liquid crystal display element L is referred to as a lower surface 5 and a face opposite to that, that is, an observation face (picture) side is referred to as an upper face (front face) 6.

On the upper face 6 of the flat transparent substrate 3, a light reflection pattern 7 is formed. The light reflection pattern 7 is formed with a plurality of approximately triangular grooves 8 and plain portions 9 adjacent to these grooves 8. The light reflection pattern 7 is formed in such a manner as the interval between the grooves 8 is differentiated depending on the locations of these grooves. That is, the ratio of the width (occupied area) of the groove 8 to the width (occupied area) of the plain portion 9 is adapted to become gradually larger in proportion to the departing of the flat transparent substrate 3 from the one side end face 4. In FIG. 7, the reflection member to increase the eight volume is omitted in depicting.

When disposing such a spread illumination apparatus 1' so as to cover the front surface of the reflection type of liquid crystal display element L, the emitted flight from the lamp 2 enters the flat transparent substrate 3 from the one side end face 4 and progresses toward the opposite face 10 while repeating reflection and refraction within it. In the meantime, the light emitted from the lower surface 5 of the flat transparent substrate 3 illuminates the reflection type of liquid crystal display element L. At that time, since the light volume emitted from the lower surface 5 due to the light reflection pattern 7 is approximately even regardless of the distance from the light source lamp 2, the reflection type of liquid crystal display element L can be illuminated in a spread manner.

By the way, in the spread illumination apparatus 41, 1' explained as an illumination means for liquid crystal display apparatus (including a reflection type of liquid crystal display element L), each has as a light source lamp 42, 2 a fluorescent tube such as a cold cathode fluorescent tube (CCFL) or a heat cathode fluorescent tube (HCFL) is used. Since, in response to a recent needs for miniaturization in thickness, the diameter of the above fluorescent lamp is formed to become in particular small, there is an anxiety of being broken due to a small shock.

Further, in order to light the fluorescent tube, it is needed to use generally a high voltage of more than hundreds—1000 V, and provided with a complicated lighting circuit called as invertor to light a fluorescent lamp, and with a space that has to be prepared for accommodating.

For that purpose, as disclosed in the Japanese patent laid-open No. Hei 10-182076, without using a fluorescent tube, there is what is provided with as a spot-light-like light source (for instance a light emitting diode) and a bar-like light source as a light source. That is, as shown in FIG. 8, a light conductive member 10 is disposed along one side end face 4 of the flat transparent substrate 3, on both ends 11 of the light conductive member 10 is provided with the spot-like light source 12 respectively. On a surface 13 opposite and parallel to the surface of the light conductive member 10 opposing to the side end face 4 of the flat transparent substrate 3, an optical path conversion means 14 later explained in detail is formed. Further, the circumferential surfaces of the light conductive member 10 other than the surface opposing to the flat transparent substrate 3 are covered with a light reflecting member (reflector) 15 for introducing the light into the flat transparent substrate with a high efficiency. The optical path conversion means 14 is formed on the surface 13 opposite to the surface opposing to the one side end face 4 of the flat transparent substrate 3, which consists of a finely concave-convex light diffusion portion 16 (dark portion in FIG. 9) formed by being partially worked by roughening and a plain portion 17 not worked by being roughened. Since a large amount of light is reflected at the light diffusion portion 16 than at the plain portion 17, more light enters the flat transparent substrate 3. Thereby, in consideration of the balance between the distance from the spot-like light source 12 and the area of the light diffusion portion 16, the optical path conversion means is formed, and although the spot-like light source 12 is disposed at the end 11, the light is emitted even from the surface opposing to the one side end face 4 of the flat transparent substrate 3, so that the light source consisting of the spot-like light source 12 and the light conductive member 10 can function as well as the conventional fluorescent tube and contribute to increase the endurance and save the electric consumption.

In FIGS. 8 and 9, although the spot-like light source 12 is disposed respectively at both ends 11 of the light conductive member 10, either one spot-like light source 12 may be disposed at one end 11. And, the optical path conversion means 14 is formed with the light diffusion portion 16 consisting of finely concave-convex portion and a plain portion 17 and otherwise by being applied with a medium containing light diffusion and reflection material or by such combination of the grooves and plain portions as well as the reflection pattern formed on the flat transparent substrate 3.

Further, although the spread illumination apparatus 1" is explained as what is provided with the light source consti-tuted with the spot-like light source 12 and the light conductive member 10 and disposed at the front of the reflection type of the liquid crystal as an auxiliary illumination apparatus mainly for reflection type of liquid crystal apparatus, in place of the light source lamp 42 of the spread illumination apparatus 41 disposed behind the liquid crystal display apparatus explained based on FIGS. 5 and 6, the light source constituted with the spot-like light source 12 and the light conductive member 10 may be used.

By the way, the spread illumination apparatus 1", since the light source thereof is constituted with the spot-like light source 12 and the light conductive member 10, has the following problems.

As shown in FIG. 10, when observing the picture while disposing the spread illumination apparatus 1" to cover the observation surface F of the liquid crystal display apparatus L, it has been found that a bright line of approximate V-letter shape as shown in FIG. 10 in hatching is generated, and it has been found difficult to observe the picture because an even spread illumination can not be realized. For reference, the grooves 8 of the light reflection pattern 7 formed on the flat transparent substrate 3 is quite fine, so that those are not recognized by eyes.

This bright line has been found to be caused by a dotted chain line arrow L1, L2. That is, the light emitted from the spot-like light source 12, as shown in arrow L3, what are reflected at the plain portion 17 of the optical path conversion means 14, progresses within the light conductive member 10, and on the other hand, as shown in arrow line L4, when enters the light diffusion portion 16, various kind of light components progress into the flat transparent substrate 3 from the one side end face 4. However, as shown in a dotted chain line arrow L1 and L2, nearby the end portion 11 of the light conductive member 10 where the spot-like light source 12 is disposed, although any light does not enter the light diffusion portion 16, since an incident angle of the light is small, such light passes through the surface opposing to the flat transparent substrate 3 and enters the flat transparent substrate 3 (hereinafter referred to "leak light", which progresses as shown as one dotted chain line arrow L1 and L2).

Accordingly, nearby the end portion 11 of the light conductive member 10 the light volume which enters the flat transparent substrate 3 will be increased by the leak light, so that, in the surface of the light conductive member 10 where the light emits, the even emission can not be realized. For reference, the volume of the leak light on the flat transparent substrate 3 becomes large because the incident angle becomes smaller as the light comes nearer to the end portion 11. Here, what is indicated by the sign B is an adhesive by which the spot-like light source 12 and the light conductive member 10 are fixed.

Therefore, the present invention is, in order to solve the above problem, to provide a spread illumination apparatus which will prevent the leak light from entering directly the flat transparent substrate and realize an even and spread light emission.

SUMMARY OF THE INVENTION

In order to solve the problem, according to a first aspect of the present invention, in a side-light system of a spread illumination apparatus, in which nearby a side end surface of the flat transparent substrate made of a light permeable material a light source consisting of a light conductive member at the end of which a spot-like light source is disposed, between said flat transparent substrate and said light source a light diffusion plate varied in its diffusion coefficient in proportion to the strength of a leak light from the spot-like light source is disposed.

According to a second aspect of the present invention, said light diffusion film is disposed at the side end of the flat transparent substrate.

According to a third aspect of the present invention, said light diffusion film is disposed at the side of the light conductive member opposing to the flat transparent substrate.

According to a fourth aspect of the present invention, on said light diffusion film a medium containing a light diffusion and reflection material having sole diffusion co-efficient is applied in a variation of an area density.

According to a fifth aspect of the present invention, on said light diffusion film, a medium containing light diffusion and reflection materials having different diffusion co-efficient is applied.

According to a sixth aspect of the present invention, on said light diffusion film, a medium containing a light diffusion and reflection material having sole diffusion co-efficient is applied partially in a overlapped manner and stepwise.

According to a seventh aspect of the present invention, on said light diffusion film, members having sole diffusion co-efficient are partially overlapped.

According to an eighth aspect of the present invention, said light diffusion film is formed in such a manner as a finely concave-convex roughness is varied.

By constructing as mentioned above, in the spread illumination apparatus of the present invention, since, between the flat transparent substrate and the light source, the light diffusion film is disposed and diffuse the leak light to disperse the strength of the leak light, the light enters the side end of the flat transparent substrate even and suspend a bright line to generate on the flat transparent substrate.

DETAILED DESCRIPTION OF PREFERRED EMBODIMENTS

Hereinafter, the constitution of the present invention is explained by illustrating one embodiment based on attached drawings.

Figure 7:
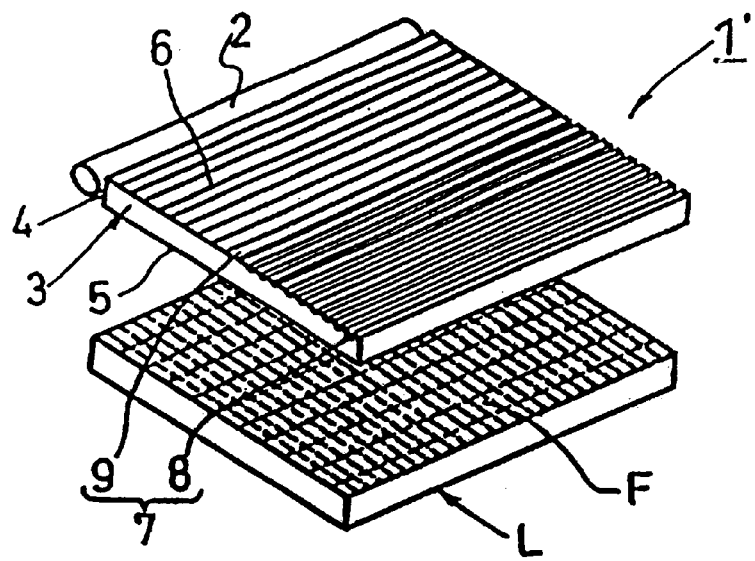
FIG. 7 is a broken and perspective view of the conventional spread illumination apparatus different from FIG. 5.
Figure 8:
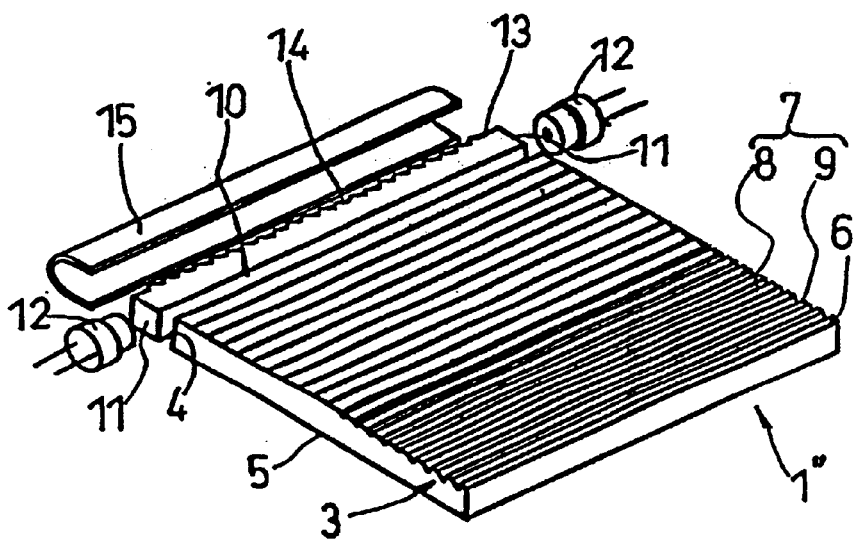
FIG. 8 is a broken and perspective view of the conventional spread illumination apparatus different from FIG. 7.
Figure 9:
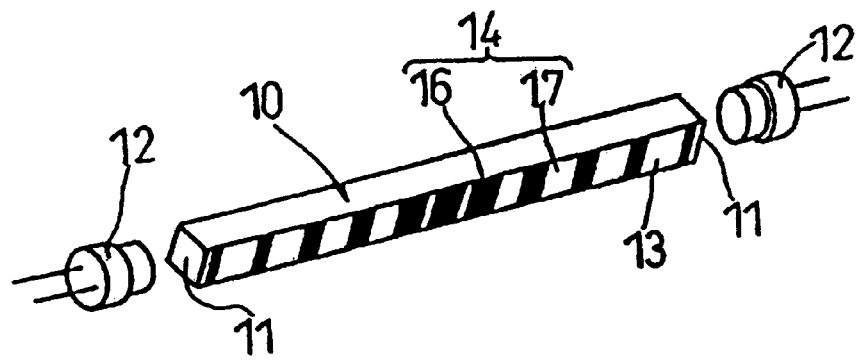
FIG. 9 is a broken and perspective view of the constitution of the light source portion shown in FIG. 8.
Figure 10:
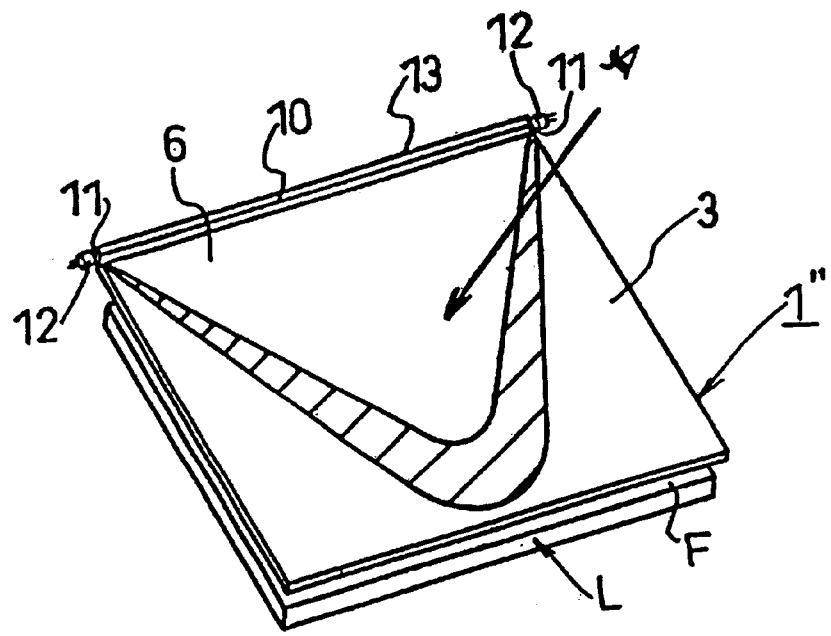
FIG. 10 is an outlined view for explaining the observation face (picture).
Figure 11:
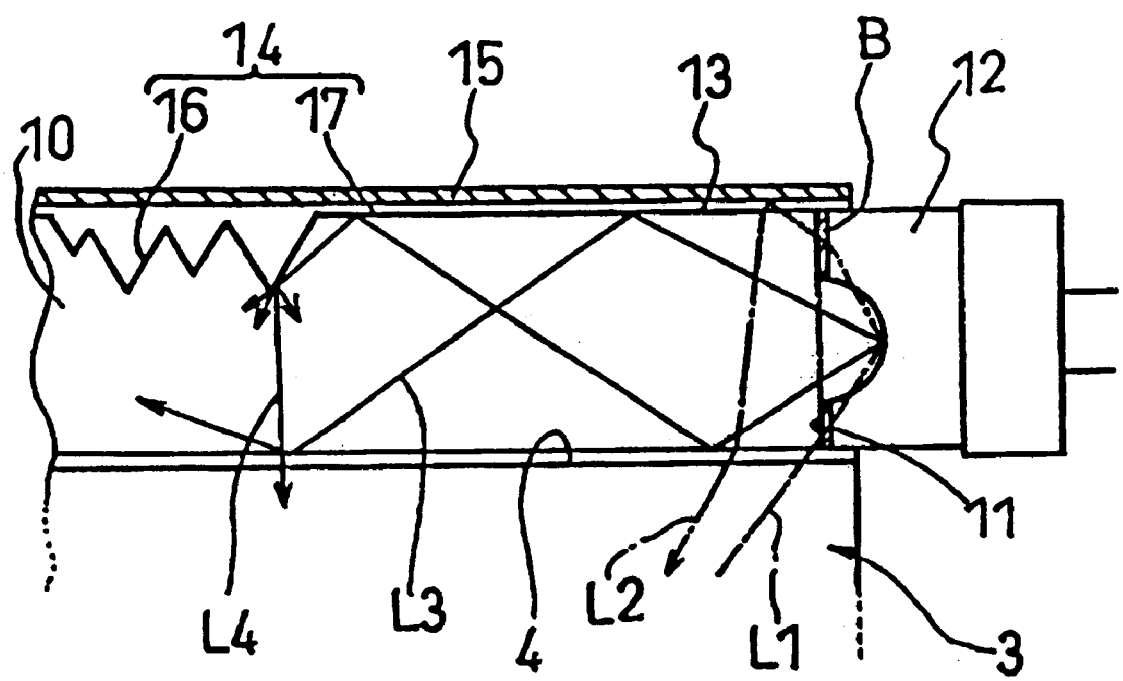
FIG. 11 is an outlined view for explaining the progressing manner of the light of the light source portion shown in FIG. 8.

For reference, since this spread illumination apparatus 1 is to be used, as well as the spread illumination apparatus 1', 1" explained in the column of the related art referring to FIGS. 7 and 8, which is disposed for covering the observation face F of the reflection type of liquid crystal display apparatus L, the same members which are used in the conventional spread illumination apparatus 1', 1", are attached with the same signs, and explanations thereof are omitted.

Figure 1:
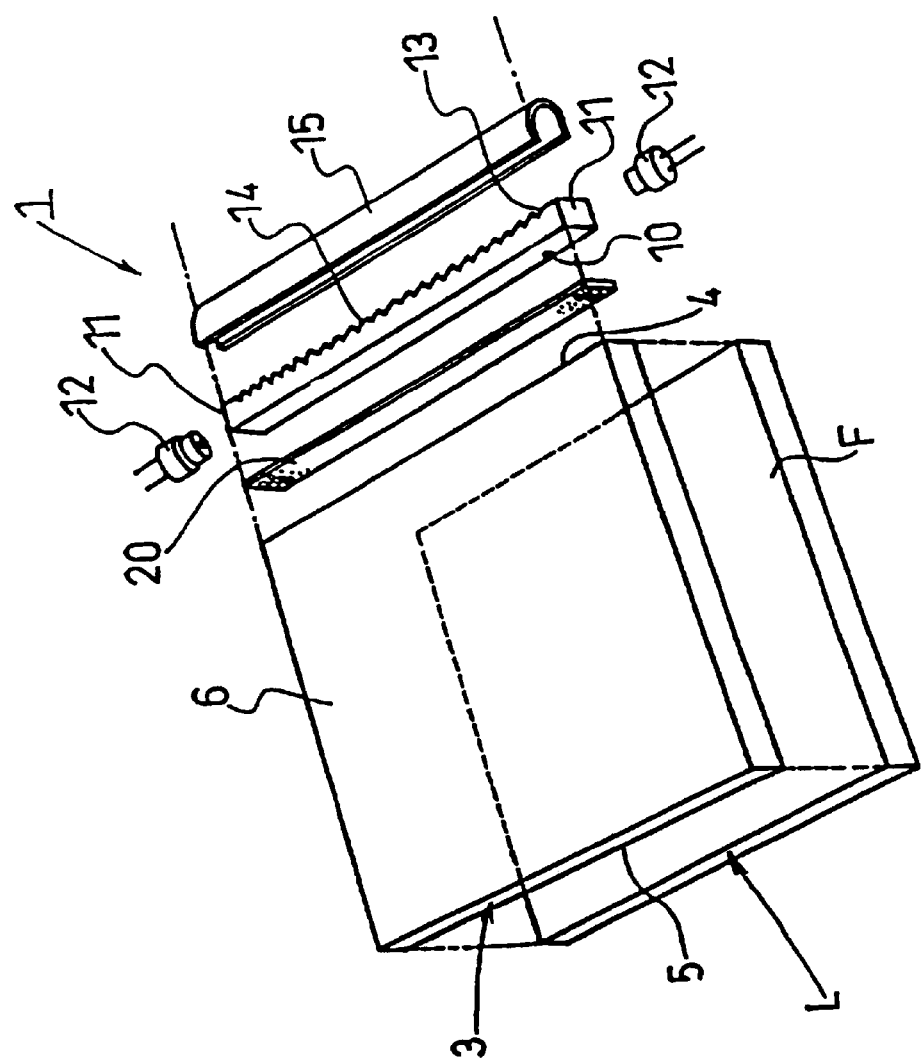
FIG. 1 is a broken and a perspective view of one embodiment of the spread illumination apparatus.

As shown in FIG. 1, the spread illumination apparatus 1 of the present invention is approximately similar with the conventional spread illumination apparatus 1", and it comprises primarily a flat transparent substrate 3 and a light source portion consisting of a light conductive member 10 and a spot-like light source 12, and the difference resides in the point where, between one side end face 4 of the flat transparent substrate 3 and the light source portion a light diffusion film 20 is provided.

Figure 2:
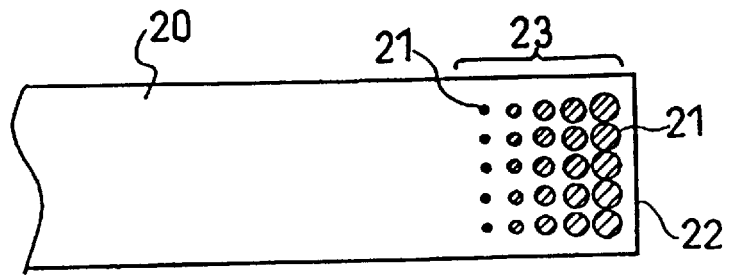
FIG. 2 is a plan view of the constitution of the light diffusion film as a main portion of the present invention.

The light diffusion film 20, as shown in FIG. 2, is prepared with a light diffusion portion 23 by applying a medium containing a light diffusion and reflection material having sole diffusion co-efficient in such a manner as a diameter of dot to be applied with the medium, while varying its area density, becomes gradually smaller from an end portion 22 toward the center (left side in FIG. 2), and the diffusion co-efficient of the light diffusion portion 23 is made to vary smaller from the end toward the center. As a light diffusion and reflection material, for instance, silicon oxide, titanium oxide and barium sulfate are used.

Figure 3:
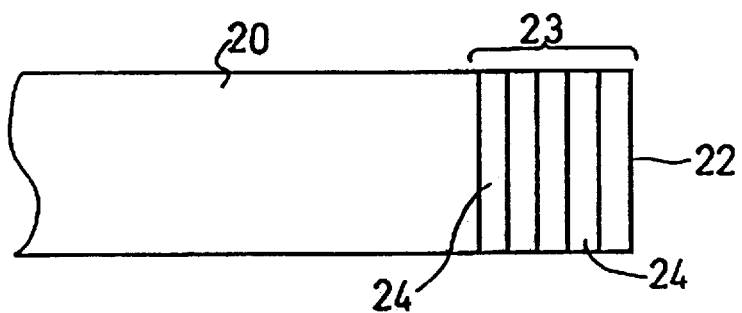
FIG. 3 is a plan view of the constitution of the light diffusion film as an another main portion different from FIG. 2 of the present invention.

FIG. 3 shows another embodiment of the light diffusion film 20, in which the light diffusion portion 23 is formed in such a manner as a medium containing light diffusion and reflection materials having different diffusion co-efficient is applied in a plurality of adjacent belts 24 along the end portion 22. At that time, since the diffusion co-efficient of the belt 24 is made to change in such a manner it becomes small gradually from the end portion 22 toward the center, an appropriately selected medium which contains the material, the diffusion of which becomes gradually small, is applied. Thus, there are two methods in applying the medium containing the diffusion and reflection materials having different diffusion co-efficient, one of which is to apply a medium the diffusion co-efficient of which is made different by changing a mixing rate of the diffusion and reflection material having sole diffusion co-efficient and the other of which is to apply a medium containing a plurality kind of the diffusion and reflection materials having different diffusion co-efficient at an appropriate location.

Figure 4:
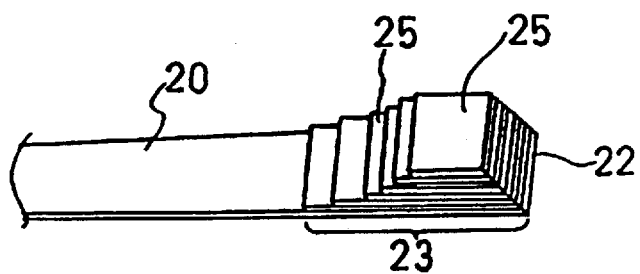
FIG. 4 is a perspective view of the constitution of the light diffusion film as another main portion different from FIG. 2 of the present invention.

FIG. 4 shows a further embodiment of the light diffusion film 20, in which the light-diffusion portion 23 is formed by overlapping partially the light diffusion material 25 having sole diffusion co-efficient. In order to change the diffusion rate of the diffusion portion 23 small gradually from the end portion 22 toward the center, the diffusion material 25 is overlapped in multiple layer more as nearer the end portion 22. Thus overlapped diffusion material 25 may be fixed by adhesive, but since the light diffusion film 20 is disposed between the light source portion and the flat transparent substrate 3, it may be pressed in contact between both of them by being clamped.

Further, as still another embodiment of the light diffusion film 20, the light diffusion portion 23 may be formed by applying a medium containing sole diffusion and reflection material having sole diffusion co-efficient by overlapping in a plurality layer more nearer the end portion 22. Further, the light diffusion film 20 may be formed, in order to form the light diffusion portion 23 which is changed in finely concave-convex roughness, by applying a work for roughening it in such a manner as the light diffusion co-efficient becomes small gradually from the end portion 22 toward the center.

Since the light diffusion film 20 is formed in such a manner that the diffusion co-efficient of the light diffusion portion 23 decreases gradually from the end portion 22 toward the center as explained above, light can be made incident in a substantially uniform manner on one face 4 of the flat transparent substrate 3 after leakage light from the spot-like light source 12, which exists in a large amount toward the end portion 11 of the light conductive member 10 shown in FIG. 1, is diffused while passing through the light diffusion film 20.

For reference, since the change of the light diffusion co-efficient of the light diffusion portion 23 is adapted to be set according to the strength of the leak light of the spot-like light source 12, for example, provided in the case where the spot-like light source 12 is disposed on either one of the end portions 11 of the light conductive member 10, at the end portion 22 which is near the spot-like light source 12 the light diffusion portion 23 may be formed.

Further, by forming the light diffusion portion 23 directly on the one side end face 4 of the flat transparent substrate 3, it can function as well as the light diffusion film 20 to contribute to save the number of parts to be used. And, in order to obtain the same effect, the light diffusion portion 23 can be formed directly on one surface of the light conductive member 10 opposing to one side end face 4, but in this case, it has to be considered that, in the light of the pattern of the optical path conversion means 14 formed on the surface 13, the light to be emitted is adapted to become even in the emitting face.

Figure 5:
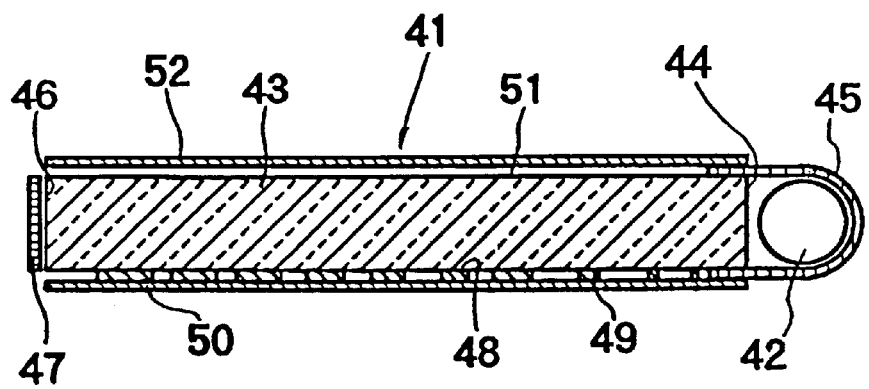
FIG. 5 is a sectional view of the constitution of a conventional spread illumination apparatus.
Figure 6:
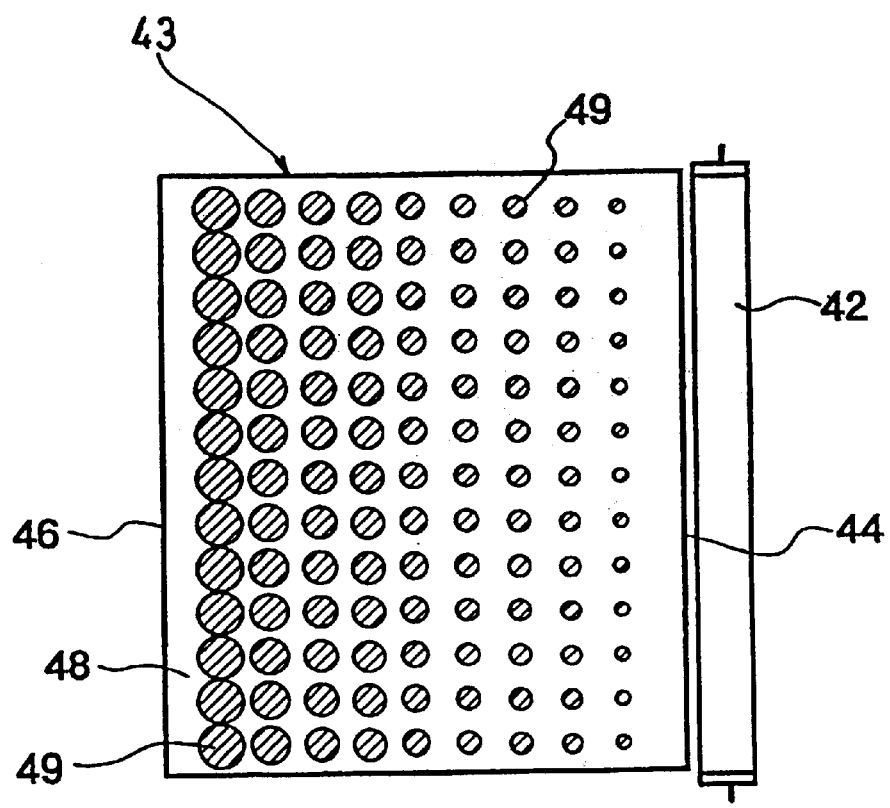
FIG. 6 is a schematic view showing a light diffusion pattern of the spread illumination apparatus shown in FIG. 5.

In the embodiment of the present invention, the spread illumination apparatus (FIGS. 7 and 8) is explained mainly as an auxiliary illumination apparatus for use of the reflection type of liquid crystal display apparatus, but the invention is not limited this, it can be applied to the conventional liquid crystal display apparatus shown for example in FIGS. 5 and 6 as a light source lamp 42 of the rear illumination apparatus 41 a rear illumination means by making it a light source portion formed by the light conductive member able to dispose the light diffusion film 20 between the light source portion and the flat transparent substrate 43.

As mentioned above in detail, since the light diffusion film in which the light diffusion co-efficient is changed according to the strength of the leak light from the light source is interposed between the flat transparent substrate and the light source portion, by diffusing the strength of the leak light it is possible to make the incident light into the one side end face of the resin substrate approximately even and prevent the leak light from entering the flat transparent substrate directly, so that the generation of a bright line on the flat transparent substrate is suspended and an even and spread illumination light is realized.

Other than the effect discussed above, since the light diffusion film is provided directly, the number of the parts to be used can be reduced.

Finally, even if the constitution of the light diffusion film is changed in various manner, the same effects mentioned above are obtained.

What is claimed is:

1. A spread illuminating apparatus of side light type, in which a light source composed of a bar-like light conductive member and including a spot-like light source at one end thereof is disposed close to an end of a flat transparent substrate made of a light transmissible material, characterized in that:

a light diffusion film, which has different diffusion coefficients from place to place depending on the intensity of leak light received from said spot-like light source, is disposed between said flat transparent substrate and said light source.

2. A spread illuminating apparatus according to claim 1, wherein said light diffusion film is directly formed on a side face of said flat transparent substrate opposing said light source.

3. A spread illuminating apparatus according to claim 1, wherein said light diffusion film is directly formed on a side face of said light conductive member opposing said flat transparent substrate.

4. The spread illuminating apparatus according to claim 1, wherein the light diffusion film comprises:

a medium of comprising a light-diffusing and reflecting substance having a same diffusion coefficient; and a base film, wherein the medium is spottedly coated on the base film so that an amount of medium coating the base film differs from place to place.

5. The spread illuminating apparatus according to claim 1, wherein the light diffusion film comprises:

a plurality of media comprising a light-diffusing and reflecting substance each having a different diffusion coefficient; and a base film, wherein the medium is discretely coated at respective places on the base film.

6. The spread illuminating apparatus according to claim 1, wherein the light diffusion film comprises:

a medium comprising a light-diffusing and reflecting substance having a same diffusion coefficient; and a base film, wherein the medium is coated solidly on the base film in a multi-layer manner, wherein the thickness of the coated layer decreases in a staircase-like manner from the top to the bottom of the light diffusion film.

7. The spread illuminating apparatus according to claim 1, wherein the light diffusion film comprises:

a sheet of material with a constant light diffusion coefficient; and a base film, wherein the sheet of material is layered on the base film so that the layers decrease in a staircase-like manner from the top to the bottom of the light diffusion film.

8. The spread illuminating apparatus according to claim 1, wherein the light diffusion film comprises:

a base layer that is finely roughened with a degree of roughness differing from place to place.

9. The spread illuminating apparatus according to claim 2, wherein the light diffusion film comprises:

a medium comprising a light-diffusing and reflecting substance having a same diffusion coefficient; and a base film, wherein the medium is spottedly coated on the base film so that an amount of medium coating the base film differs from place to place.

10. The spread illuminating apparatus according to claim 3, wherein the light diffusion film comprises:

a medium comprising a light-diffusing and reflecting substance having a same diffusion coefficient; and a base film, wherein the medium is spottedly coated on the base film so that an amount of medium coating the base film differs from place to place.

11. The spread illuminating apparatus according to claim 2, wherein the light diffusion film comprises:
   a plurality of media comprising a light-diffusing and reflecting substance, each having a different diffusion coefficient; and
   a base film, wherein the medium is discretely coated at respective places on the base film.

12. The spread illuminating apparatus according to claim 3, wherein the light diffusion film comprising:
   a plurality of media comprising a light-diffusing and reflecting substance, each having a different diffusion coefficient; and
   a base film, wherein the medium is discretely coated at respective places on the base film.

13. The spread illuminating apparatus according to claim 2, wherein the light diffusion film comprises:
   a medium comprising a light-diffusing and reflecting substance having a same diffusion coefficient; and
   a base film, wherein the medium is coated solidly on the base film in a multi-layer manner, wherein the thickness of the coated layer decreases in a staircase-like manner from the top to the bottom of the light diffusion film.

14. The spread illuminating apparatus according to claim 3, wherein the light diffusion film comprises:
   a medium light-diffusing and reflecting substance having a same diffusion coefficient; and
   a base film, wherein the medium is coated solidly on the base film in a multi-layer manner, wherein the thickness of the coated layer decreases in a staircase-like manner from the top to the bottom of the light diffusion film.

15. The spread illuminating apparatus according to claim 2, wherein the light diffusion film comprises:
   a sheet of material with a constant light diffusion coefficient; and
   a base film, wherein the sheet of material is layered on the base film so that the layers decrease in a staircase-like manner from the top to the bottom of the light diffusion film.

16. The spread illuminating apparatus according to claim 3, wherein the light diffusion film comprises:
   a sheet of material with a constant light diffusion coefficient; and
   a base film, wherein the sheet of material is layered on the base film so that the layers decrease in a staircase-like manner from the top to the bottom of the light diffusion film.

17. The spread illuminating apparatus according to claim 2, wherein the light diffusion film comprises:
   a base layer that is finely roughened with a degree of roughness differing from place to place.

18. The spread illuminating apparatus according to claim 3, wherein the light diffusion film comprises:
   a base layer that is finely roughened with a degree of roughness differing from place to place.

* * * * *